United States Patent [19]

Sattler

[11] Patent Number: 5,400,398
[45] Date of Patent: Mar. 21, 1995

[54] ELECTRONIC TELEPHONE SET WITH LOW POWER HOOK SWITCH

[75] Inventor: Peter Sattler, Vienna, Austria

[73] Assignee: U.S. Philips Corporation, New York, N.Y.

[21] Appl. No.: 136,427

[22] Filed: Oct. 13, 1993

[30] Foreign Application Priority Data

Oct. 14, 1992 [EP] European Pat. Off. ......... 92203158

[51] Int. Cl.$^6$ ............................................. H04M 1/31
[52] U.S. Cl. ............................... 379/387; 379/362; 379/359
[58] Field of Search ............... 379/387, 90, 62, 102, 379/100, 362, 359

[56] References Cited

U.S. PATENT DOCUMENTS

| | | | |
|---|---|---|---|
| 4,815,126 | 3/1989 | Goode et al. | 379/359 |
| 4,887,295 | 12/1989 | Jenkins | 379/387 |
| 5,003,578 | 3/1991 | Lin | 379/90 |
| 5,191,606 | 3/1993 | Juang | 379/387 |

OTHER PUBLICATIONS

Philips Data Handbook "IC's for Telecom Subscriber Sets, Cordless Telephones, Mobile/Cellular Radio Pagers CA 3089 to PDC 4413" Bock ICO3a, 1991.

*Primary Examiner*—James L. Dwyer
*Assistant Examiner*—Jacques M. Saint-Surin
*Attorney, Agent, or Firm*—David R. Treacy

[57] ABSTRACT

A subscriber set includes two line terminals, and electronic telephone set circuit, and a hook switch for switching the line current. A microswitch may suffice because the subscriber set comprises a series combination of a main current path of a first transistor and the telephone set circuit coupled to the line terminals, in that the subscriber set includes one resistor connected at least in parallel with the main current path of the first transistor and used for supplying power to at least part of the electronic telephone set circuit if the first transistor is non-conducting and in that the hook switch in a first status is arranged for coupling one of the line terminals to the control electrode of the first transistor via said part of the electronic circuit so as to render the first transistor conductive and, in a second status, for coupling the other line terminal to the control electrode of the first transistor by way of said part of the electronic circuit so as to render the first transistor non-conductive.

16 Claims, 2 Drawing Sheets

ELECTRONIC TELEPHONE SET WITH LOW POWER HOOK SWITCH

BACKGROUND OF THE INVENTION

The invention relates to a subscriber set comprising two line terminals, a hook switch and an electronic telephone set circuit.

Such a subscriber set is known, for example, from the Philips Data Handbook "IC's for Telecom Subscriber Sets, Cordless Telephones, Mobile/Cellular Radio Pagers CA 3089 to PCD 4413", Book IC03a, 1991.

On page 851 of this handbook a block diagram of such a subscriber set is shown comprising terminals a/b, b/a for connecting the subscriber set to a transmission line, for example, a telephone line. The subscriber set comprises an electronic telephone set circuit which includes, for example, a transmission circuit TEA 1060, a dedicated microcontroller PCD 3349, drivers such as the PCF 8576 and a RAM such as the PCF 8571.

This telephone set circuit is connected in customary fashion to the line terminals by way of a rectifier circuit and a hook switch. This hook switch is a mechanical switch or a relay through which the line current flows coming from the subscriber line. This means that the hook switch is arranged for switching a power equal to the maximum line current occurring in very short subscriber lines, and the associated DC line voltage increased by the ringing signal power. Such a hook switch is relatively expensive for modem telephone sets.

SUMMARY OF THE INVENTION

It is an object of the invention to realise advantageously the function of the hook switch and not to interrupt the line current by means of a relay or a mechanical switch. The subscriber set according to the invention is characterized, in that a series combination of a main current path of a first transistor and the telephone set circuit is provided coupled to the line terminals, in that the subscriber set includes one resistor connected at least in parallel with the main current path of the first transistor and used for supplying power to at least part of the electronic telephone set circuit if the first transistor is non-conducting, in that in a first status the hook switch is arranged for coupling one of the line terminals to the control electrode of the first transistor by way of said part of the electronic circuit so as to render the first transistor conductive and in a second status for coupling the other line terminal to the control electrode of the first transistor by way of said part of the electronic circuit so as to render the first transistor non-conductive. This is advantageous in that a very low-priced switch such as a microswitch may suffice for the mechanical part of the hook switch because it is not included in the line current loop. According to a further embodiment of the invention the subscriber set is characterized in that the telephone set circuit comprises a $\mu$ processor which has a power-down mode.

By using the $\mu$ processor already available in a subscriber set for monitoring the hook switch function even if the subscriber set is switched off, a reduction is obtained of the number of components necessary for realising this hook switch function. According to a further embodiment of the invention the subscriber set is characterized in that the $\mu$ processor comprises a signal output coupled to the control input of the first transistor and a status input coupled to the hook switch for controlling the first transistor in response to the status of the hook switch.

With these measures there is achieved that the status input of the $\mu$ processor is capable of detecting the status of the hook switch.

According to a further embodiment of the invention the subscriber set is characterized, in that a reset circuit is inserted between the hook switch and a reset input of the $\mu$ processor and in that the reset circuit has a signal blocking input for connecting an external power source.

This is advantageous in that the reset circuit is switched off if the subscriber set is connected to an external power source without the use of the subscriber line.

According to a further embodiment of the invention the subscriber set is characterized, in that the subscriber set comprises an electronic pulse dialling circuit which the first transistor forms part of.

This is advantageous in that the function of the hook switch can completely be realised by means of electronic components already available in the subscriber set.

The invention and its advantages will be further explained with reference to the Figures represented in the drawing.

DESCRIPTION OF THE PREFERRED EMBODIMENT

Figure 1:
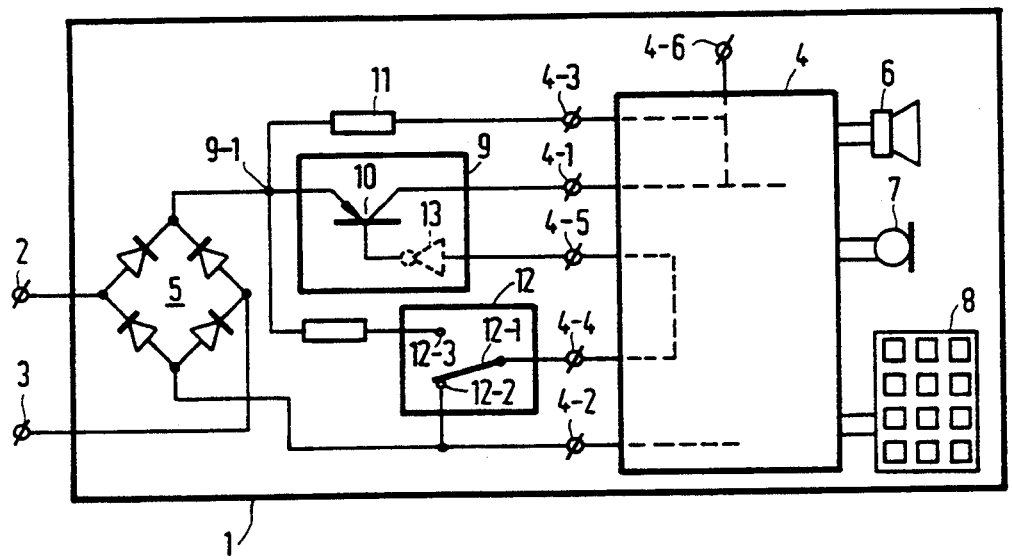
FIG. 1 shows a block diagram of a subscriber set according to the invention.

The subscriber set 1 shown in FIG. 1 comprises line terminals 2 and 3 for connecting the set to the a and b wires of a subscriber line (not shown). The subscriber set 1 further includes a telephone set circuit 4 by which a telephone 6, a microphone 7 and a key pad 8 as well as devices (not further shown) are coupled in customary fashion. The telephone set circuit is normally connected to the line terminals 2 and 3 via a rectifier circuit 5 and a line interrupter, usually the hook switch inserted between the line terminal 2 and the rectifier circuit 5. According to the invention the subscriber set 1 comprises a first series combination inserted between the line terminals 2 and 3, which series combination comprises at least the main current path of a first transistor 10 arranged in a line interrupter, and the telephone set circuit 4. More specifically, line terminal 2 is connected to a first terminal 4-1 of the telephone set circuit 4 by way of the rectifier circuit 5 and the main current path of the first transistor 10, and the line terminal 3 is connected to a second terminal 4-2 of the telephone set circuit 4 also by way of the rectifier circuit 5. The subscriber set further includes a resistor 11 connected in parallel with the main current path of the first transistor 10 to a third terminal 4-3 of the telephone set circuit. The input terminals 4.1 and 4.3 are internally interconnected as is shown in FIG. 1 by way of a dashed line.

The switch arm or movable contact 12-1 of the single pole double throw hook switch 12 represented in FIG. 1 is coupled to the control electrode of the first transistor 10 by way of a fourth input 4-4 and an output 4-5. With a line voltage at which line terminal 2 is positive relative to line terminal 3 the hook switch connects in a first status (the status not shown) the line terminal 2 via switch contact 12-3 to the input 4-4; and in a second status (the status shown) connects the line terminal 3 via switch contact 12-2 to the input 4-4. If the voltage of the line terminal 3 is positive relative to that of the line terminal 2, the hook switch 12 in the first status connects line terminal 3 to input 4-4; and in the second status connects line terminal 2 to input 4-4.

The operation of the circuit described thus far is as follows. If the receiver is on the hook, the hook switch is in the status shown and the low voltage of hook switch contact 12-2 is applied by means of a voltage inversion symbolically represented by inverter 13 as a high voltage to the base of the first transistor, so that this transistor is blocked and the telephone set circuit 4 has no power supply. When the receiver is lifted off the hook, the base voltage changes from high to low and transistor 10 is rendered conductive. The telephone set circuit 4 receives line current, so that the telephone set 1 is switched on.

Figure 2:
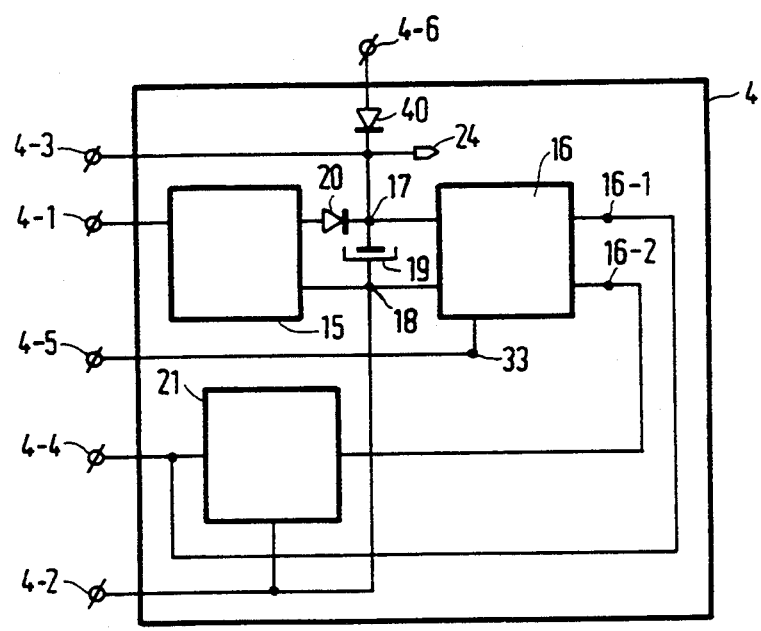
FIG. 2 shows an embodiment of part of the electronic telephone set circuit according to the invention.

As shown in FIG. 2 the telephone set circuit 4 of a modem telephone set 1 comprises a line transmission circuit 15 and a $\mu$ processor 16. In the status (not shown) of the hook switch 12 the line current for driving the transmission circuit 15 fed through input terminal 4-1 partly flows back directly via junction 18 to input terminal 4-2, and the remaining part flows back to input terminal 4-2 via the junction 17, the $\mu$ processor 16 and junction 18. A large capacitor 19 for eliminating brief line interruptions e.g. as a result of dialling pulses to be transmitted is inserted between the junctions 17 and 18.

Furthermore, according to the invention the line interruptor 9 is bridged by means of a high-value resistor 11 and inserted between the rectifier circuit 5 and the junction 17 and the $\mu$ processor 16 has a what is commonly referred to as power-down mode. The $\mu$ processor 16 adopts this mode when there is insufficient power supply and then inactivates a large part of its circuit. Only a minor portion of the $\mu$ processor remains active. In this mode the output 33 of the $\mu$ processor 16 is low. If the receiver is on the hook, the very small supply current necessary for the $\mu$ processor in this mode is supplied by the subscriber line via the high-impedance resistor 11. Diode 20 then avoids this current draining via the transmission circuit 15. The arm 12-1 of the hook switch 12 is further connected, on one hand, to the status input 16-1 of the $\mu$ processor 16 via input 4-4 and, on the other hand, to a reset input 16-2 of the $\mu$ processor 16 via a reset circuit 21.

Figure 3:
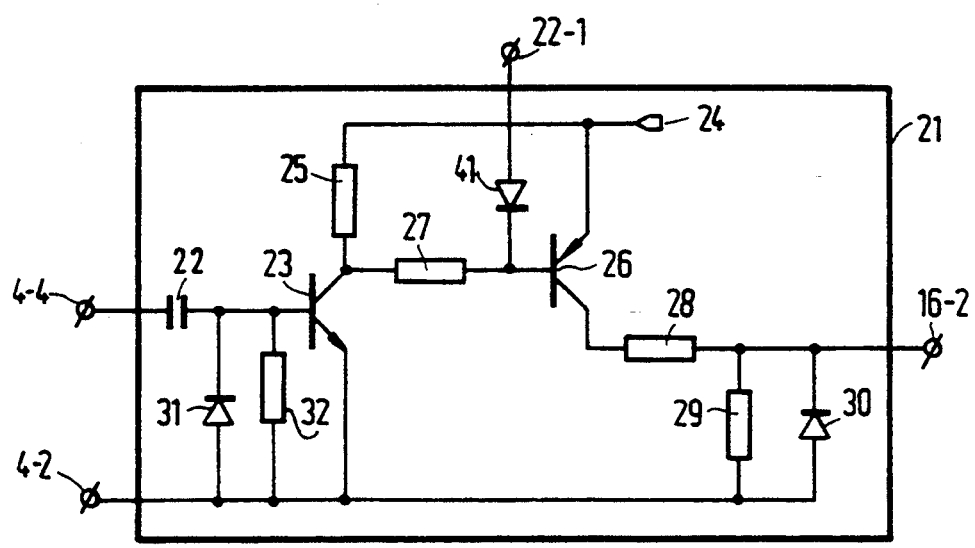
FIG. 3 shows an embodiment of a reset circuit to be used in a subscriber set according to the invention.
Figure 4:
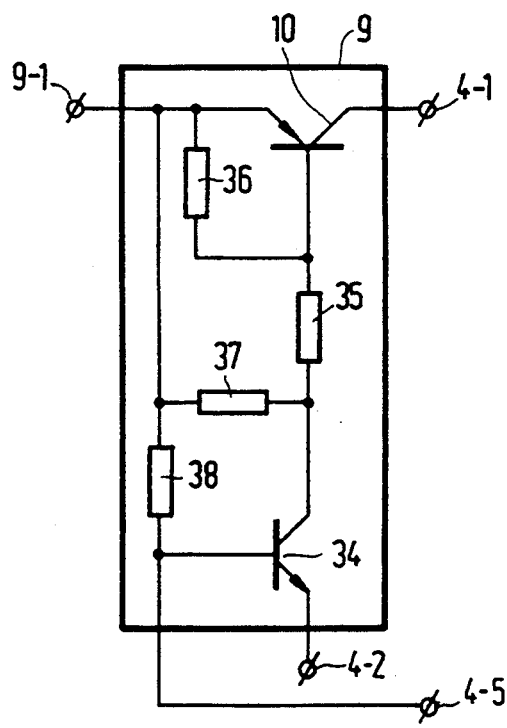
FIG. 4 shows another embodiment of a line interrupter to be used in a subscriber set according to the invention.

The direct voltage fed back to input terminal 4-4 of the reset circuit 21 (FIG. 3) by the hook switch 12 is blocked by the capacitor 22. The voltage fed to the base of transistor 23 by resistor 32 is then equal to the voltage of the emitter electrode of this transistor 23, so that the latter is rendered non-conductive. The supply voltage supplied by input terminal 4-3 (FIG. 2) via terminal 24 is fed both to the emitter of transistor 26 and, via the resistors 25 and 27, to the control electrode of the transistor, so that this transistor is also rendered non-conductive. The voltage on the reset input 16-2 is thus maintained at the low voltage level of input terminal 4-2 by way of resistor 29. The $\mu$ processor 16 causes the voltage of output 33 to remain low. When a line interrupter 9 is used while the first transistor 10 forms part of an already available pulse dialling circuit as shown in FIG. 4, no additional transistor is necessary. The low output voltage of the $\mu$ processor 16 causes the voltage of the control electrode of transistor 34 to remain equal to the emitter voltage of this transistor 34, so that this transistor continues to be non-conducting. Consequently, also the first transistor 10 continues to be non-conducting.

If the receiver is lifted off the hook, the voltage on input terminal 4-2 changes from low to high. This voltage change is transferred by capacitor 22 (FIG. 3), so that transistor 23 is temporarily rendered conductive. A current will then flow from input terminal 4-3 (FIG. 2) via terminal 24, resistor 25 (FIG. 3) and transistor 23 to input terminal 4-2. The voltage drop caused to occur across the resistor 25 will render transistor 26 conductive by way of terminal 24, the base-emitter junction of transistor 26, resistor 27 and transistor 23.

The current flowing through transistor 26 will change by way of resistors 28 and 29 the voltage of the reset input 16-2 from low to high, so that the $\mu$ processor 16 is reset. Once the capacitor 22 has been charged, transistor 23 will be rendered non-conductive and so will transistor 26 and the voltage of reset input 16-2 will return to low.

Due to this resetting the $\mu$ processor 16 checks its status input 16-1. The voltage on this input is high because the receiver is off the hook. Consequently, the $\mu$ processor drives its output 33 high. This high voltage will render transistor 34 conductive. Consequently, a current will flow from input terminal 9-1 via the base-emitter junction of the first transistor 10, the resistor 35 and transistor 34 to terminal 4-2, as a result of which the first transistor 10 is rendered conductive and power is supplied to telephone set circuit 4.

The reset circuit 21 in this embodiment is necessary because the $\mu$ processor 16 in the power-down mode requires this circuit to be reset before the signal on status input 10-1 is considered. Once power has been applied through the line to the subscriber set 1 and hence to the $\mu$ processor 16, the $\mu$ processor 16 periodically checks its status input 16-1 and the reset circuit 21 is further made redundant. This also applies if the $\mu$ processor 16 is fed from the next terminal power source.

An external power source (not shown) may be connected to the input 4-6 of the telephone set circuit 4. The external power source supplies a supply current to the $\mu$ processor 16 by way of diode 40 and junction 17. The external power source is also connected to a signal blocking input 22-1 of the reset circuit 21. Via diode 41 the external power source causes the voltage of the control electrode of transistor 26 to maintain the same level as the emitter of this transistor 26, that is to say, by way of diode 41 and terminal 24. Transistor 26 is then rendered non-conductive and the reset input 16-2 of the $\mu$ processor is maintained at a low voltage by way of resistor 29.

I claim:

1. Subscriber set comprising two line terminals, a hook switch and an electronic telephone set circuit, characterized in that a series combination of a main current path of a first transistor and the telephone set circuit is provided coupled to the line terminals, in that the subscriber set includes one resistor connected at least in parallel with the main current path of the first transistor and used for supplying power to at least part of the electronic telephone set circuit if the first transistor is non-conducting, and in that in a first status the hook switch is arranged for coupling one of the line terminals to the control electrode of the first transistor by way of said part of the electronic circuit so as to render the first transistor conductive and in a second status for coupling the other line terminal to the control electrode of the first transistor by way of said part of the electronic circuit so as to render the first transistor non-conductive.

2. Subscriber set as claimed in claim 1, characterized in that the telephone set circuit comprises μ processor which has a power-down mode.

3. Subscriber set as claimed in claim 2, characterized in that the μ processor comprises a signal output coupled to the control input of the first transistor and a status input coupled to the hook switch for controlling the first transistor in response to the status of the hook switch.

4. Subscriber set as claimed in claim 3, characterized in that a reset circuit is inserted between the hook switch and a reset input of the μ processor and in that the reset circuit has a signal blocking input for connecting an external power source.

5. Subscriber set as claimed in claim 4, characterized in that the subscriber set comprises an electronic pulse dialling circuit which the first transistor forms part of.

6. Subscriber set as claimed in claim 2, characterized in that the subscriber set comprises an electronic pulse dialling circuit which the first transistor forms part of.

7. Subscriber set as claimed in claim 1, characterized in that the subscriber set comprises an electronic pulse dialling circuit which the first transistor forms part of.

8. Subscriber set as claimed in claim 1, characterized in that the μ processor comprises a signal output coupled to the control input of the first transistor and a status input coupled to the hook switch for controlling the first transistor in response to the status of the hook switch.

9. Subscriber set as claimed in claim 8, characterized in that a reset circuit is inserted between the hook switch and a reset input of the μ processor and in that the reset circuit has a signal blocking input for connecting an external power source.

10. Subscriber set as claimed in claim 9, characterized in that the subscriber set comprises an electronic pulse dialling circuit which the first transistor forms part of.

11. Subscriber set as claimed in claim 8, characterized in that the subscriber set comprises an electronic pulse dialling circuit which the first transistor forms part of.

12. Subscriber set comprising two line terminals, a hook switch and an electronic telephone set circuit, characterized in that the set further comprises:
- a series combination of a main current path of a first transistor and the telephone set circuit, coupled to the line terminals, and
- a resistor connected at least in parallel with said main current path, for supplying power to at least part of the electronic telephone set circuit if said first transistor is non-conducting, and
- said hook switch has a first contact connected to said part of the electronic telephone set circuit, a second contact connected to one of said line terminals, and a third contact connected to the other of said line terminals,
- in a first status said hook switch coupling said one of said line terminals to said control electrode via said part so as to render the first transistor conductive, and
- in a second status said hook switch coupling said other of said line terminals to said control electrode via said part so as to render the first transistor non-conductive.

13. Subscriber set as claimed in claim 12, characterized in that said telephone set circuit comprises a μ processor which has a power down mode in which a minor portion of the μ processor remains active, said minor portion being said part.

14. Subscriber set as claimed in claim 13, characterized in that the μ processor comprises a signal output coupled to the control input of the first transistor and a status input coupled to the hook switch for controlling the first transistor in response to the status of the hook switch.

15. Subscriber set as claimed in claim 13, characterized in that a reset circuit is inserted between the hook switch and a reset input of the μ processor and in that the reset circuit has a signal blocking input for connecting an external power source.

16. Subscriber set as claimed in claim 12, characterized in that the subscriber set comprises an electronic pulse dialling circuit which the first transistor forms part of.

* * * * *